United States Patent
Poe

[11] 3,820,634
[45] June 28, 1974

[54] SHOCK RESISTING ENERGY ABSORBING DEVICE

[75] Inventor: Lloyd Richard Poe, Los Angeles, Calif.

[73] Assignee: Hartwell Corporation, Los Angeles, Calif.

[22] Filed: Aug. 10, 1973

[21] Appl. No.: 387,326

[52] U.S. Cl............... 188/1 C, 188/129, 188/130, 267/33, 267/153
[51] Int. Cl............................................. F16f 7/12
[58] Field of Search........... 188/1 B, 1 C, 129, 130; 74/492; 267/9 B, 9 C, 33, 21 A, 21 R, 63 A, 63 R, 141, 153; 293/70

[56] References Cited
UNITED STATES PATENTS

| 2,139,666 | 12/1938 | Bogart | 188/129 X |
| 2,819,063 | 1/1958 | Neidhart | 188/129 UX |
| 3,160,233 | 12/1964 | Norman et al. | 188/129 X |
| 3,179,036 | 4/1965 | Cardwell | 267/33 X |

FOREIGN PATENTS OR APPLICATIONS

| 598,485 | 6/1934 | Germany | 267/9 C |

Primary Examiner—Duane A. Reger
Attorney, Agent, or Firm—Lyon & Lyon

[57] ABSTRACT

A shock resisting energy absorbing device, wherein one or more indenting elements engage and move along an elastomeric member to cause progressive deformation and attendant energy absorption, the indenting elements being backed by a spring in such a manner that should a shock load occur in excess of the normal working load, the energy absorption is increased proportionally resulting in increased resistance to movement.

9 Claims, 16 Drawing Figures

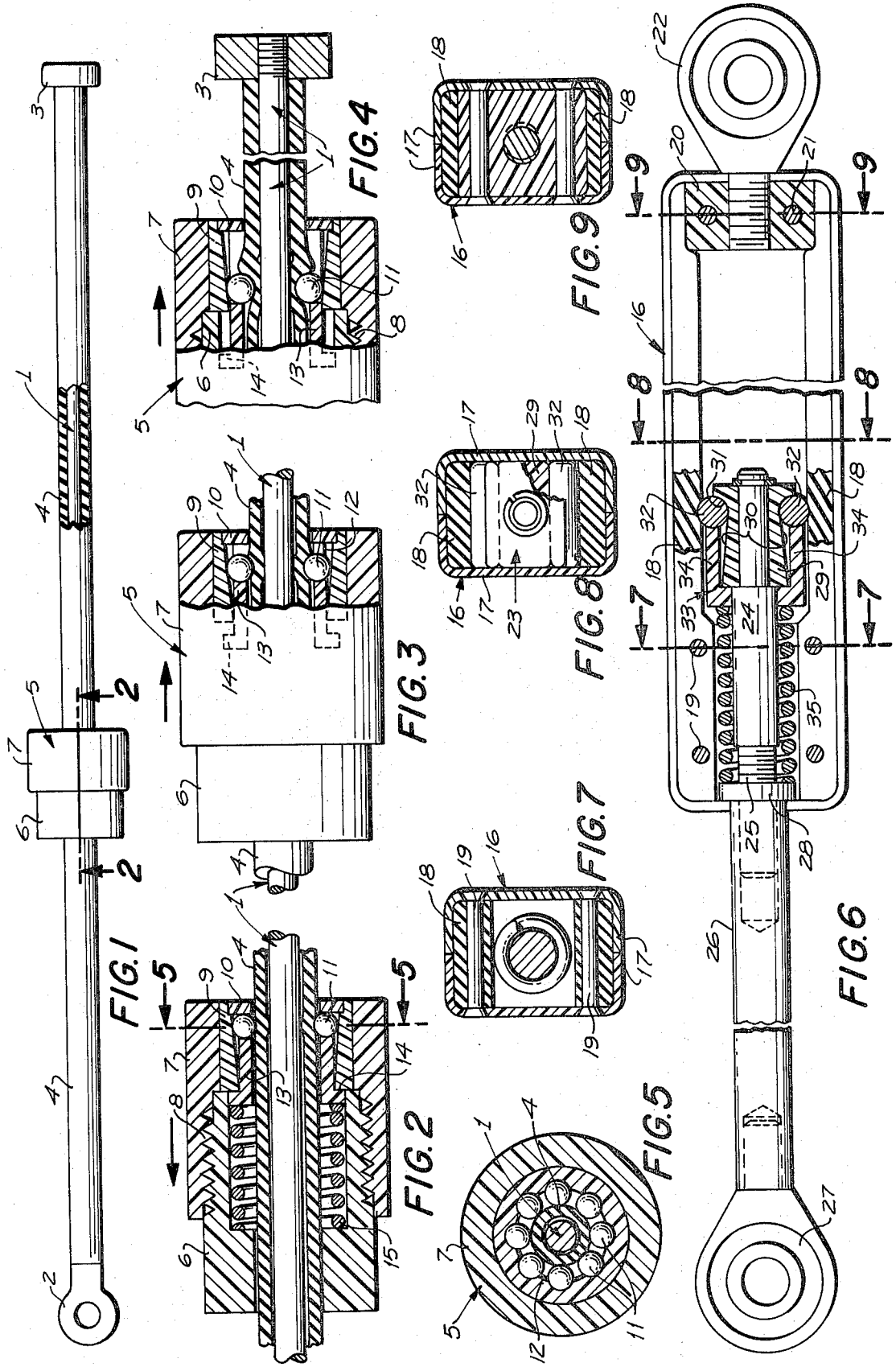

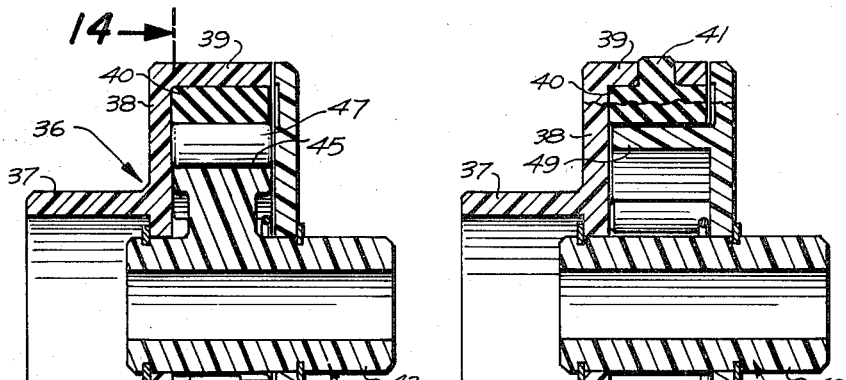
FIG.12
FIG.13
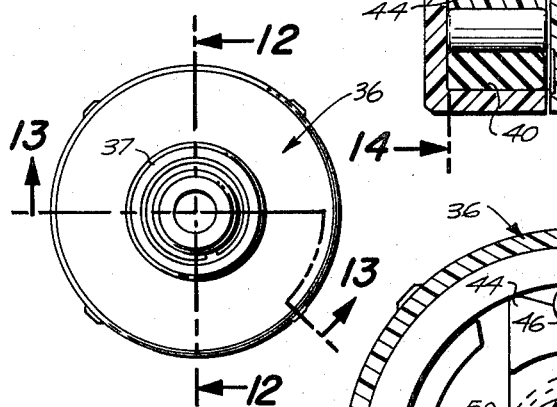
FIG.10
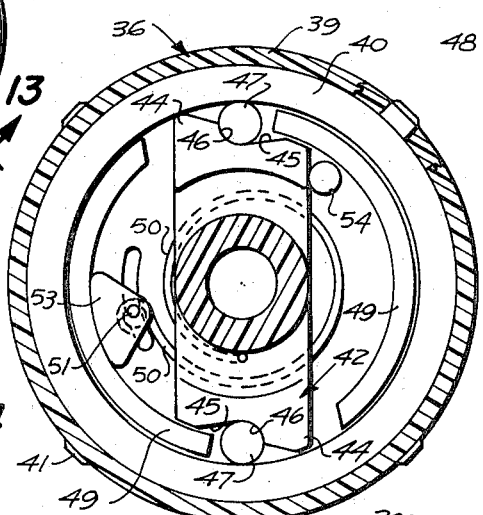
FIG.14
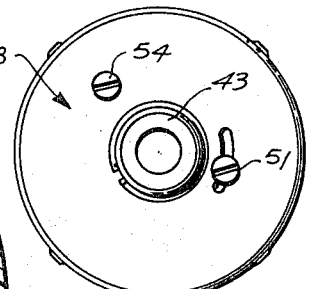
FIG.11
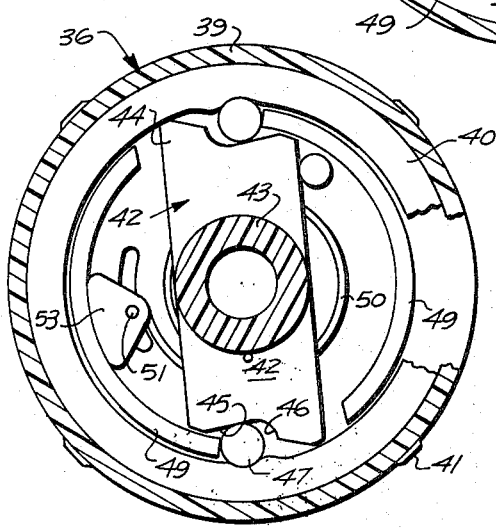
FIG.15
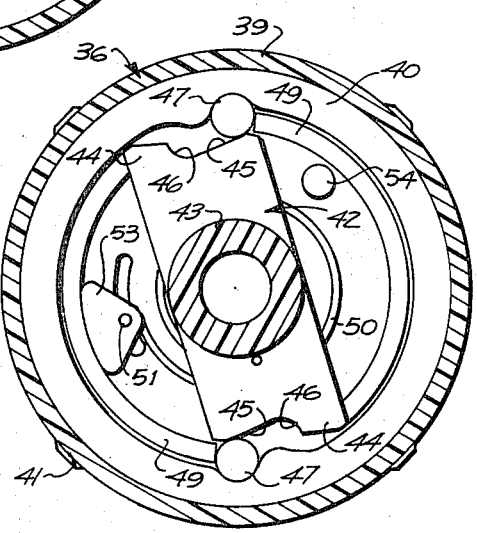
FIG.16

SHOCK RESISTING ENERGY ABSORBING DEVICE

BACKGROUND AND SUMMARY OF THE INVENTION

This invention is related to two of my previous inventions, one of which resulted in U.S. Pat. No. 3,696,891, the other one of which is copending. While the previous inventions had some degree of shock resistance, the present invention is directed to energy absorbing devices which are primarily intended for uses where the devices are often subjected to shock loads. The present invention is summarized in the following objects.

First, to provide a shock resisting energy absorbing device utilizing indenting elements which engage and move relative to an elastomeric member to cause progressive deformation and attendant energy absorption as disclosed in my previous patent and application; and further incorporating an adjustable as well as yieldable backing means which permits further indention in proportion to the extent that additional shock loads are applied, even to the extent, if desired, of arresting relative movement of the parts of the device.

Second, to provide a shock resisting energy absorbing device, one embodiment, involves an elongated shaft having an elastomeric sleeve and a traveler assembly incorporating a spring backed set of indenting balls arranged in a ring.

Third, to provide a shock resisting energy absorbing device, another embodiment of which involves a novel housing of rectangular cross section having an opposed pair of elastomeric strips, between which is mounted a pair of indenting rollers backed by a spring in a manner to effect materially increased resistance if subjected to shock loads.

Fourth, to provide a shock resisting energy absorbing device, a further embodiment of which involves a novel circular housing lined with a elastomeric ring which is engageable by angularly movable indenting elements carried by a spring loaded mounting means so arranged to effect materially increased resistance when subjected to shock loads.

DESCRIPTION OF THE FIGURES

FIG. 1 is a side view showing one embodiment of the shock resisting energy absorbing device.

FIG. 2 is an enlarged fragmentary sectional view taken through 2—2 of FIG. 1, showing the parts in their essentially neutral position during retraction of the carrier unit.

FIG. 3 is a similar view depicting the parts during a normal energy absorbing movement.

FIG. 4 is also a similar view, but showing the parts as they appear under shock load.

FIG. 5 is a transverse sectional view taken through 5—5 of FIG. 2.

FIG. 6 is a fragmentary longitudinal sectional view showing a second embodiment of the shock resisting energy absorbing device, the parts being shown in their neutral position when the device is extended or when the carrier unit is being retracted.

FIG. 7, 8, and 9 are transverse sectional views taken respectively through 7—7, 8—8, and 9—9 of FIG. 6.

FIG. 10 is an end view of another embodiment of the shock resisting energy absorbing device in which the parts are arranged for relative rotary movement as distinguished from relative longitudinal movement.

FIG. 11 is an elevational view of the end opposite from that shown in FIG. 10.

FIG. 12 is an enlarged transverse sectional view taken through 12—12 of FIG. 10.

FIG. 13 is an enlarged sectional view taken through 13—13 of FIG. 10.

FIG. 14 is a sectional view taken through 14—14 of FIG. 12 showing the parts in their essentially neutral position.

FIG. 15 is a sectional view similar to FIG. 14, but showing the parts as they appear under normal energy absorbing operation.

FIG. 16 is a sectional view corresponding to FIGS. 14 and 15 but showing the parts as they appear when the device is under shock load.

Reference is first directed to FIGS. 1 through 5. The embodiment here illustrated includes a shaft 1 having an attachment ring 2 at one end and a head 3 at the other end. The shaft receives a sleeve 4 formed of elastomeric material. The sleeve is not bonded to the shaft, but is capable of limited longitudinal movement between shoulders formed by the attachment ring 2 and head 3 to the extent that a portion of the sleeve may be compressed axially while the remaining portion is subject to tension.

Slidably mounted on the sleeve is a carrier assembly 5 which comprises a cylindrical member 6 and a cap member 7 joined by a screwthreaded connection 8. A portion of the cap member projects beyond the body member 6 and is provided with a bore which receives a wedging cone or cam 9 that may be cemented or otherwise secured to the cap member. The axially outer or larger end of the cone 9 is provided with a retainer ring 10 which is permanently secured in place.

The wedging cone which confronts the sleeve 4 receives a set of indenting balls 11 which engage the sleeve 4. The indenting balls may be spaced by ribs 12. Slidably fitted within the wedging cone 9 and engageable with the balls 11 is a stop collar 13 which engages the balls to limit movement thereof. The stop collar extends into the body member 6 and is provided with a flanged end 14 which is engaged by a compression spring 15 mounted within the body member 6.

Operation of the shock resisting energy absorbing device embodied in FIGS. 1 through 5 is as follows:

When the carrier assembly 5 is moved to the left as viewed in FIG. 1, the balls are held by the spring in the larger end of the wedging cone 9. In this position, the balls indent the sleeve a minimal distance.

When the carrier assembly 5 is moved to the right as viewed in FIG. 1, the balls indent further into the sleeve and distort the sleeve in the vicinity of the balls as shown in FIG. 3, also some distributed compression of the sleeve takes place between the balls and the head 3. The proportions of the various parts are such that the resistance to movement, which is the energy absorbed by the sleeve 4, is within predetermined limits so that movement is checked to the desired degree. However, should the carrier be suddenly subjected to a shock load which would tend to move the carrier at an increased speed; the resistance to movement is caused to increase materially in fact, even to the extent of stopping movement of the carrier assembly 5. This condition is indicated in FIG. 4. On relaxation of the shock load the movement of the carrier returns to normal.

The manner of use of the energy absorbing device has a relatively wide range. Various attachment means, not shown, may be secured to the carrier assembly and other attachment means joined to the ring 2 or to the head 3. The preferred mode of operation is to absorb energy when the carrier assembly is moved in a direction to place tension on the shaft rather than compression.

Referring to the aforementioned U.S. Pat. No. 3,696,891, the interrelationship of the sleeve and its supporting shaft that is, the sleeve is not bonded to the shaft but is capable of sliding movement which materially increases the amount of energy that may be absorbed while reducing most local stress on the elastomeric member. This is brought out more fully in the aforementioned patent. The feature of primary importance in the present invention involves the relationship of the indenting balls 11 and the spring 15 whereby under shock loads, the spring retracts and materially increases the energy absorption effect produced in the elastomeric sleeve so as to counteract the shock load.

Reference is now directed to FIGS. 6 through 9. This embodiment includes a housing structure 16 of rectangular cross section and comprises two complementary shells 17 in confronting relation along the narrow sides of the structure. Fitted within the shells at the narrow sides of the housing structure is a pair of elastomeric strips 18. Near one end, the shells 17 receive rivets 19 which also serve to hold the corresponding end of the elastomeric strips 18 in place. The opposite end of the housing structure receives a mounting block 20 secured by rivets 21 which also secure the corresponding ends of the shells 17. Secured to the mounting block and extending from the housing structure, is an attachment ring 22 which may include a bearing.

Slidable within the housing structure 16 is a carrier assembly 23 which includes a shaft 24. The shaft is joined by a screwthreaded connection 25, to a shaft extension 26 protruding from the housing structure 16 and provided at its extremity with an attachment ring 27 similar to the attachment ring 22. A stop ring 28 received on the screwthreaded connection 25 limits outward movement of the shaft 24 and its extension 26.

The carrier assembly 23 includes a wedge member 29 mounted on the shaft 24. The wedge member is provided with a pair of opposed cam surfaces 30 confronting the elastomeric strips 18. The cam surfaces converge toward the axially inner ends of the carrier assembly and terminate at a pair of stop shoulders 31. A pair of indenting rollers 32 are positioned between the cam surfaces 30 and the elastomeric strips 18. Slidably received on the shaft 24 is a collar 33 having a pair of projections 34 which extend between the cam surfaces 30 and the elastomeric strips 18 and engage the indenting rollers 32. A spring 35 is interposed between the stop ring 28 and the collar 33. The stop ring 28 is adjustable so as to vary the force exerted by the spring 35.

The operative relationship between the elastomeric strips 18, rollers 32, cam surfaces 30, collar 33 with its projections 34 and spring 35 is essentially the same as in the first described embodiment. More particularly, when tension is applied to the shaft extension 26, the carrier assembly 23 moves to the left as shown in FIG. 6. This movement constitutes the return movement of the carrier assembly and the rollers make minimal contact with the elastomeric strips 18. When a compression load is applied to the shaft extension 26 the rollers tend to move along the cam surfaces and indent further into the elastomeric strips 18 is causing the elastomeric strips to absorb energy while offering resistance to movement. This is the condition corresponding to the condition shown in FIG. 3. Should the shaft extension 26 and the carrier assembly 23 be subjected to a shock load during movement to the right as shown in FIG. 6, the spring 35 is further retracted and the energy absorbed by the elastomeric strips 18 is in proportion to the shock load.

It will be noted that throughout the region of the elastomeric strips which is engaged by the indenting rollers 32, the elastomeric strips are capable of movement relative to the confronting surfaces of the housing structure so that the energy absorbed by the strips is not local but is distributed along the strips and thus enabling the elastomeric strips to function under shock load without damage.

Reference is now directed to FIGS. 10 through 16. The embodiment of the invention here illustrated is intended for uses in conjunction with components which rotate relative to each other rather than undergo relative longitudinal movement. This embodiment includes a housing structure 36 having a hub 37 joined to a radiating disk 38 joined to a cylindrical wall 39 extending axially in the opposite direction with respect to the hub 37. Fitted within the cylindrical wall 39 is an elastomeric ring 40 having projections 41 extending through perforations in the wall 39 so that the ring cannot rotate within the wall but substantial portions thereof are capable of limited circumferential displacement to accomplish energy distribution.

Rotatably mounted within the ring 40 is a carrier assembly 42 having a hub 43 in alignment with the hub 37 and a set of radiating bosses 44. In the construction illustrated a pair of bosses are shown however, the number of bosses may be increased to meet different operating conditions.

The radially outer side of each boss 44 is provided with a cam surface 45 sloping radially inward. The radially inner end of each cam surface is provided with a shoulder 46. A roller 47 is interposed between each cam surface and the surrounding elastomeric ring 40.

A cover disk 48 is mounted on the hub 43 and is capable of rotation with respect to the hub 43 and its bosses 44. Extending axially from the cover disk 48 is a set of stop segments 49, one for each indenting roller 47. One end of each stop segment clears the corresponding boss 44 to engage the corresponding indenting roller 47. The other end of each segment 49 engages a side of the other boss 44. If more than two bosses are provided the remaining end of each segment engages the circumferentially adjacent boss. In either case, the segments 49 permit limited arcuate movement of the cover disk 48 so as to extend or retract the segment with respect to a corresponding indenting roller 47. Wrapped about the hub 43 is a spring 50 one end of which is fixed to the hub or to one of the bosses 44 while the other end is attached to an adjustable anchor 51 in the form of a bolt or screw which extends through an arcuate slot provided in the cover disk 48. The screw engages a clamp nut 53. The screw is accessible from the outside of the cover disk and the clamp nut is shaped so as to engage one of the stop segments to prevent rotation so that the screw may be loosened or tightened from the outside of the cover disk. By adjusting the position of the anchor screw 51 the force exerted by the spring 50 may be adjusted. A removable stop pin 54 accessible from the outside of the cover disk 48, may be provided to limit the extent of movement of the stop segments 49 with respect to the cam surfaces 35.

Operation of the embodiment shown in FIGS. 10 through 16 is essentially the same as the previously described embodiments except that the relative movement is rotational rather than longitudinal. More specifically, when the carrier assembly 42 rotates in a clockwise direction with respect to the elastomeric ring 40, as viewed in FIGS. 14, 15 and 16, the rollers ride against the shoulders 46 and make minimal contact with the elastomeric ring 40. This is the condition indicated in FIG. 14. Under normal energy absorbing operation, the carrier assembly rotates a counterclockwise direction causing the rollers to ride outward on the cam surfaces 45 and indent a predetermined amount into the elastomeric ring 40 as determined by the position of the corresponding stop segment 49. Should a shock load occur, the rollers bear against the stop segments 49 cause the stop segments to turn clockwise as viewed in FIG. 16 increasing the amount of indentation into the ring 40 so as to absorb the increased energy produced by the shock load. When the shock load is terminated, the rollers tend to return to their normal position indicated in FIG. 13.

Having fully described my invention it is to be understood that I am not to be limited to the details herein set forth, but that my invention is of the full scope of the appended claims.

I claim:

1. A shock resisting energy absorbing device, comprising:
   a. a support member;
   b. an indentible energy absorbing member confronting the support member;
   c. a carrier means movable with respect to the support member and energy absorbing member, the carrier means including a cam surface and an indenting means movable on the cam surface to press into and effect variable indention of the energy absorbing member thereby to alter the amount of energy absorbed by the energy absorbing member;
   d. yieldable means carried by the carrier means urging the indenting means toward a position of minimum indention to provide a predetermined energy absorption during a predetermined rate of movement of the carrier with respect to the energy absorbing member;
   e. said yieldable means being responsive to sudden increase in said rate of movement to permit movement of the indenting means with respect to the cam surface in a direction to effect a proportional increased indention and a corresponding increase of energy absorption by the energy absorbing member;
   f. said yieldable means also being responsive to release of the force which caused the sudden increase in rate of movement, to permit return of the indenting means to its initial position.

2. A shock resisting energy absorbing device, as defined in claim 1, wherein:
   a. the support member is a rod;
   b. the energy absorbing member is an elastomeric sleeve receiving the rod and capable of limited axial displacement on the rod to effect distribution of energy absorption;
   c. and a ring of ball members constitute the indenting means.

3. A shock resisting energy absorbing device, as defined in claim 1, wherein:
   a. the support member is an elongated housing;
   b. and the energy absorbing member is disposed within the housing and confronts a wall thereof.

4. A shock resisting energy absorbing device, as defined in claim 3, wherein:
   a. said housing is rectangular in cross section;
   b. a pair of energy absorbing members line opposing walls of the housing;
   c. and a pair of rollers constitute the indenting means.

5. A shock resisting energy absorbing device, as defined in claim 1, wherein;
   a. the support member, is circular;
   b. the energy absorbing member is a ring lining the support member;
   c. and the carrier is rotatable within the energy absorbing ring.

6. A shock resisting energy absorbing device, as defined in claim 1, wherein:
   a. the support member is circular;
   b. the energy absorbing member is a ring of elastomeric material lining the support member;
   c. the carrier includes a hub and radial bosses forming the cam surfaces and rollers constituting the indenting means;
   d. the yieldable means includes a circular spring;
   e. a rotatable plate carries the spring and includes means for transmitting force between the indenting means and the spring.

7. A shock resisting energy absorbing device, comprising:
   a. an elongated supporting rod, having abutment shoulders at its extremities;
   b. an energy absorbing indentible elastomeric sleeve disposed on the rod between the abutment shoulders and capable of limited slidable movement relative to the rod;
   c. a carrier unit surrounding the sleeve and slidable therealong, the carrier unit including a conical cam element surrounding and confronting the sleeve, and a set of indenting balls interposed between the cam element and the sleeve for indenting engagement therewith;
   d. a ring within the carrier unit movable with respect to the cam to control the maximum indenting position of the indenting balls;
   e. and a spring backing the ring and yieldably urging, through the ring, the indenting balls toward a position of minimum indention with respect to the sleeve thereby to provide predetermined energy absorption by the sleeve during normal movement of the carrier unit along the sleeve;
   f. said spring being yieldable to attempted sudden increase in force applied between the indenting balls and sleeve to permit increased indentation thereby to produce a counteracting increase in energy absorption by the sleeve.

8. A shock resisting energy absorbing device, comprising:
   a. a tubular housing structure of polygonal cross section forming a pair of opposed walls;

b. a pair of energy absorbing indentible elastomeric strips lining said walls;

c. a carrier unit movable in the housing structure between the elastomeric strips, said carrier unit including a pair of opposed cam elements confronting the elastomeric strips and rollers thereon for indenting engagement therewith;

d. a shaft extending from the carrier unit for external engagement to move the carrier within the housing structure;

e. a spring mounted on the shaft;

f. means engaged by the spring and extending over the cam elements for engagement with the rollers to urge the rollers toward positions of minimum indentation thereby to provide predetermined energy absorption by the elastomeric strips during normal movement of the carrier unit;

g. said spring being yieldable to attempted sudden increase in force applied to between the indention rollers and elastomeric strips to permit increased indentions thereby to produce a counteracting increase in energy absorption by the elastomeric strips.

9. A shock resisting energy absorbing device, comprising:

a. a housing defining a chamber having a cylindrical wall;

b. an energy absorbing indentible elastomeric liner for said wall and fixed at spaced intervals against rotation relative to the cylindrical wall;

c. a rotatable carrier unit including a hub, radiating bosses terminating in cam surfaces confronting the elastomeric liner, and rollers interposed between the cam surfaces and the elastomeric liner;

d. a disk mounted on the carrier unit hub for limited circumferential displacement relative to the cam surfaces and including arcuate elements engageable with the indenting rollers;

e. and a spring interconnecting the disk and carrier unit to urge the indenting rollers, through the arcuate elements, along the cam surfaces toward positions of minimum indentation of the elastomeric liner during normal rotational movement of the carrier unit;

f. said spring being yieldable to attempted sudden increase in force applied indenting ball and sleeve to permit movement of the indenting rollers with respect to the cam surface in a direction to increase indentation of the elastomeric liners thereby to produce a counteracting increase in energy absorption.

* * * * *